Figure 3:
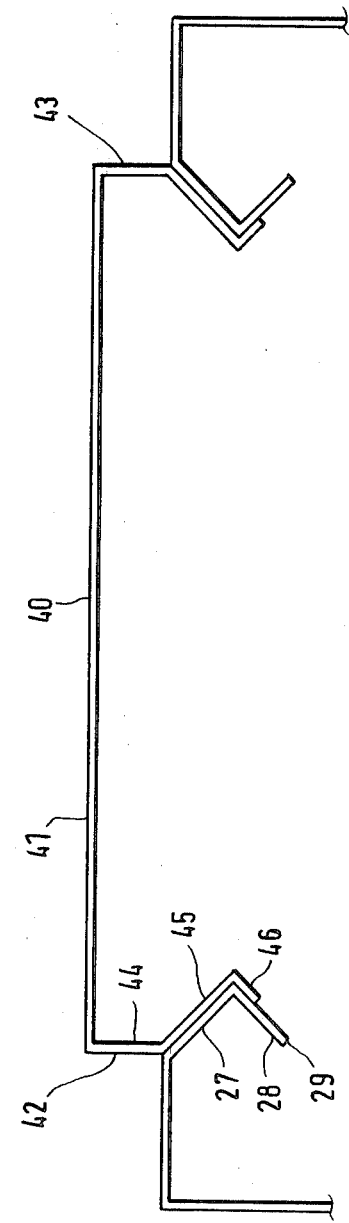

United States Patent [19]

von Wietersheim et al.

[11] 4,396,112
[45] Aug. 2, 1983

[54] CONVEYOR AND SUPPORT STRUCTURE

[75] Inventors: Klaus von Wietersheim, Heiligenhaus, Fed. Rep. of Germany; Gijsbertus van der Akker, Heerlen, Netherlands

[73] Assignee: Mayfran GmbH, Essen, Fed. Rep. of Germany

[21] Appl. No.: 229,158

[22] Filed: Jan. 28, 1981

[30] Foreign Application Priority Data

Feb. 11, 1980 [DE] Fed. Rep. of Germany ....... 3005038

[51] Int. Cl.$^3$ ...................... B65G 17/10; B65G 21/16
[52] U.S. Cl. .................................. 198/822; 198/814; 198/838; 198/861
[58] Field of Search ............... 198/814, 822, 841, 861, 198/838, 845

[56] References Cited

U.S. PATENT DOCUMENTS

| 1,352,312 | 9/1920 | Pines | 198/841 X |
| 2,922,513 | 1/1960 | Hapman | 198/822 X |
| 3,773,166 | 11/1973 | Nowacki | 198/841 X |

FOREIGN PATENT DOCUMENTS

| E 8636 | 11/1956 | Fed. Rep. of Germany | 198/822 |
| 1324076 | 7/1973 | United Kingdom | 198/841 |

*Primary Examiner*—James L. Jones, Jr.
*Assistant Examiner*—Douglas D. Watts
*Attorney, Agent, or Firm*—Dressler, Goldsmith, Shore, Sutkar & Milnamow, Ltd.

[57] ABSTRACT

A part of the arcuate guides for the hinged belt (13) of the conveyor consists of solid curved pieces (247, 270) which are fastened releasably to parts of the conveyor frame. In the region of the drive station, guide plates (35; 299) which are fastened to the side pieces (17, 18; 220) are assigned to the empty side of the hinged belt. A U-shaped baseplate (20; 232) is connected with its upwardly projecting legs, to the side pieces (17, 18; 220). If the conveyor is a lifting conveyor with a lower and an upper horizontal longitudinal section as well as with a longitudinal section which is directed obliquely upwards, the arcuate guides consist of curved crosspieces (33, 34; 276, 294) which extend between the side pieces (17, 18; 220), in the region of the mutually angled longitudinal sections. The lower and middle longitudinal sections of the conveyor can each be connected partly by means of a welded-in gusset plate, the inner sides, lying opposite one another, of the gusset plates (265) and of adjacent side pieces (220) being welded to the curved crosspiece (276). The baseplate (20; 232) leaves an intervention opening (47) free in the region of the drive station (M). Reversing drums (37; 240) for the hinged belt (13) are located at the reversing station (U). A spring element (66) which smooths out changing tensile stresses is adjustable together with the drive unit when the hinged belt (13) is tensioned. The abovementioned features permit a compact construction, resistant to warping and to bending, of the conveyor, together with a long life. The invention also relates to a process for manufacturing the conveyor.

14 Claims, 16 Drawing Figures

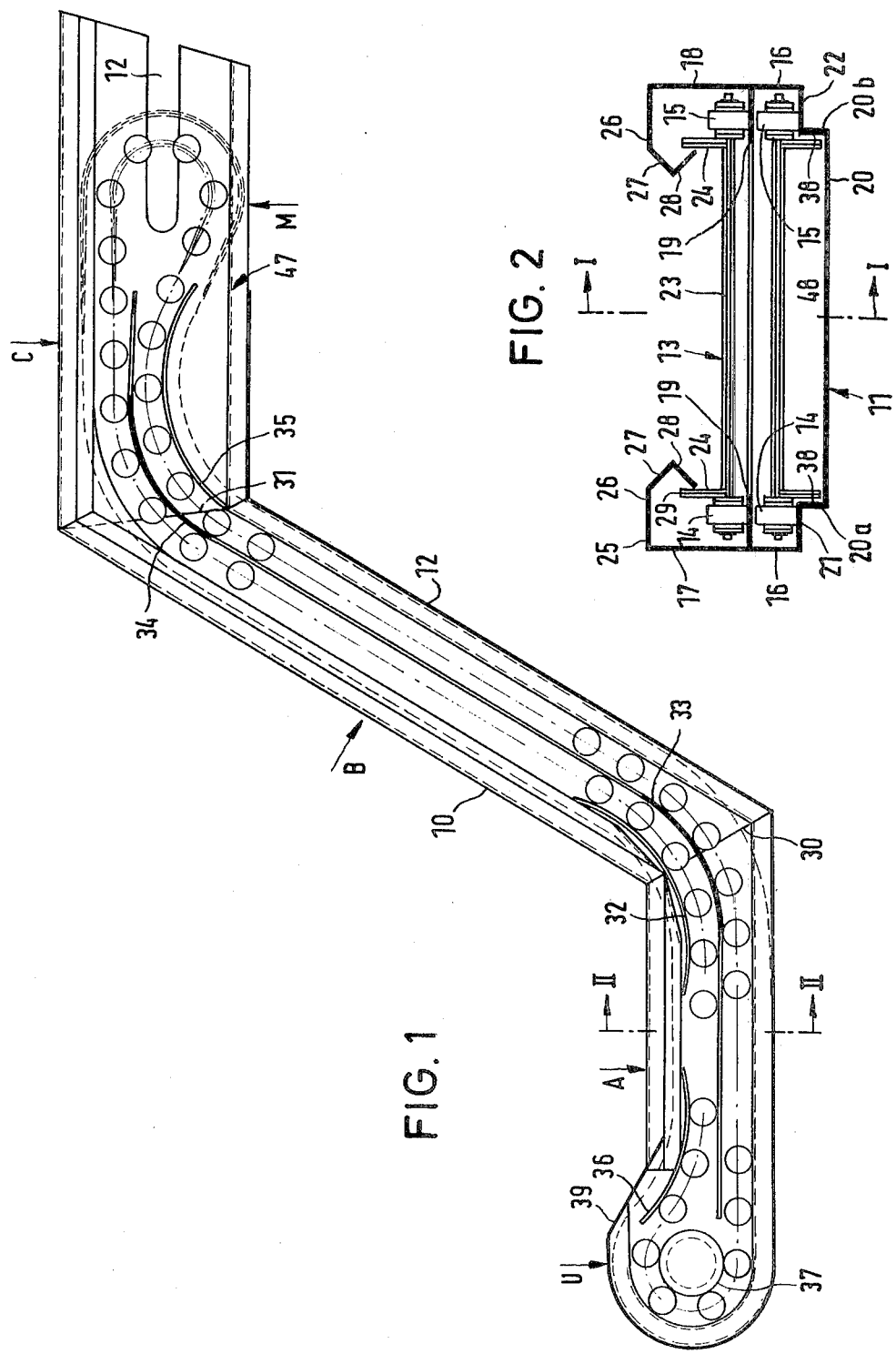

CONVEYOR AND SUPPORT STRUCTURE

The invention relates to a conveyor, particularly a hinged belt conveyor, preferably for metal waste such as chips or the like, with a conveyor frame, U-shaped in cross-section, one end of which is provided with a protected drive station which is adjustable in the longitudinal direction of the conveyor and is supported by means of an abutment, and the other end of which is provided with a reversing station for an endless flexible hinged belt whose running rollers are guided in guide channels which are constituted by U-shaped formed metal sheets, whose web is fastened to the inside of side pieces connected by crosspieces, as well as by the lower, inwardly bent legs of said formed metal sheets, arcuate guides being provided in the reversing regions for the conveyor belt.

German Pat. 2,166,212 describes a hinged belt conveyor with a conveyor frame between whose side pieces extends a box-shaped stiffening, on the top side of which the conveying side of the hinged belt is supported via slide tracks which are fastened, along the side margins of the hinged belt, on the box-shaped stiffening. The underside, also, of the box-shaped stiffening carries slide tracks for the empty side of the hinged belt, so that, in the case of vibrations, this cannot strike directly against the box-shaped stiffening. The side pieces overlap, with parts directed horizontally inwards towards one another, with a spacing, the free upper edge of the lateral border of the hinged belt, with a clearance, both in the region of the working side and in the region of the empty side. This known hinged belt conveyor is intended, above all, to be used in the case of small machine tools, such as automatic machines for the manufacture of components in the watch and clock industry, particular importance having been attached to the simple recovery of the cutting oil, adhering to the metal chips, over a relatively long operating time, without servicing by an operator. Consequently, whereas this conveyor has proved preeminently suitable for the abovementioned intended use, its construction is expensive for the production of hinged belt conveyors of conventional size and of very large dimensions.

The object of the invention is to improve a conveyor of the known type mentioned in the introduction, in such a way that, without detriment to its rigidity, it can be constructed more simply, more easily and more cheaply with considerably smaller material outlay, together with an extended life, simplified servicing and handling and improved protection for the operating personnel.

The invention achieves this object due to the fact that a number of arcuate guides consist of releasably fastened solid curved pieces, one pair of which is fastened at the reversing station to the underside of a chute plate which extends downwards, between the side pieces, from the top side of the reversing station towards the conveyor belt, and that the lower legs of the side pieces which guide the empty side of the hinged belt are connected by means of a U-shaped baseplate which is guided round the reversing station with the exception of the top side of the latter.

The arcuate guides, on the one hand, impart a high rigidity to the conveyor frame and, on the other hand, bring about a substantially extended life of the conveyor due to the design of a part of the arcuate guides as solid curved pieces and due to their releasability. These solid curved pieces which are particularly exposed to wear are fitted so that they can easily be replaced. In this connection, the baseplate which is U-shaped in cross-section contributes considerably to stiffening the conveyor frame and, if appropriate, permits liquid-tight sealing of the conveyor frame for the circumstance when, for example, liquid dripping from the conveyed material is to be collected. The use of formed metal sheets which are fastened to the side pieces enables the conveyor frame to be produced very quickly and simply and the devices, which are to be made for the parts, to be quickly adapted to the dimensions desired at any given time.

If the conveyor is designed as a lifting conveyor, the curved crosspieces offer a particularly high resistance to warping.

The gusset plates which are welded-in between the side pieces of adjacent longitudinal sections of the lifting conveyor enable the conveyor sections to be welded together more securely and impart to the conveyor frame, in conjunction with the curved crosspieces, a high resistance to warping and to bending, this resistance being further increased in conjunction with the solid curved pieces which are fastened to the gusset plates lying opposite one another.

The fitting of solid curved pieces in the bend between the upper end of the middle longitudinal section and the upper horizontal longitudinal section of the conveyor permits, also in this region, considerable stiffening of the conveyor frame in conjunction with keeping the bend region free of conveyed material.

The design of the arcuate guides in the region of the drive station as guide plates for guiding the hinged belt back into the empty side imparts to the conveyor, irrespective of whether it is designed as a standard conveyor extending in a straight line or as a lifting conveyor, an additional stiffening of the conveyor frame, the location of the baseplate at the drive station guarantees a safe accessibility of the inside of the conveyor frame in the region of the drive station or discharge station.

The additional form of construction of the U-shaped formed metal sheets enables mutually overlapping lateral borders to be accommodated in the upper side of the hinged belt, the additional profiling of the formed metal sheets contributing to a further stiffening of the conveyor frame.

The reversing drums in the reversing station permit a simple assembly and a practically doubled life, since, before a replacement, they can be fastened again, after being turned through 180°, to the side pieces of the reversing station, in order that the peripheral part of the reversing drums, which has hitherto not served to guide the hinged belt, can now serve to guide the latter.

When the hinged belt is tensioned by displacing the drive station in the direction of the end of the conveyor, the spring abutment of the drive station is simultaneously also displaced and a separate adjustment of this spring abutment independently of the displacement of the drive station is not required. In this case, the initial stress of the spring element is maintained, to compensate the alternating tensile loads which are transmitted from the conveyed material via the hinged belt to the drive station.

The screening plates at the drive station offer the operators reliable protection against contact with the chain wheels and, when the hinged belt is tensioned or re-tensioned in respect of the conveyor frame, require no additional releasing and refastening, since the screening plates fastened to the bearing blocks are moved together with the displacement of the bearing blocks, which is associated with the tensioning of the hinged belt in the longitudinal direction of the conveyor. Additional protection of the operators is achieved by means of the guard plates which are welded to the inside of the screening plates.

The process according to this invention enables the conveyor to be produced cheaply, in a simple way, in an extremely short time, since the parts, such as, for example, the solid curved pieces and the gusset plates, can be stocked in the desired sizes, because their dimensions are always the same, and since the shaping of the remaining parts is effected merely by cutting, bending and deep-drawing, so that for the mirror-image joining of two side pieces two devices only are required, these being set, respectively, to the dimensions of the parts to be assembled.

The invention is illustrated diagrammatically in the drawing, with reference to several exemplary embodiments.

Figure 4:
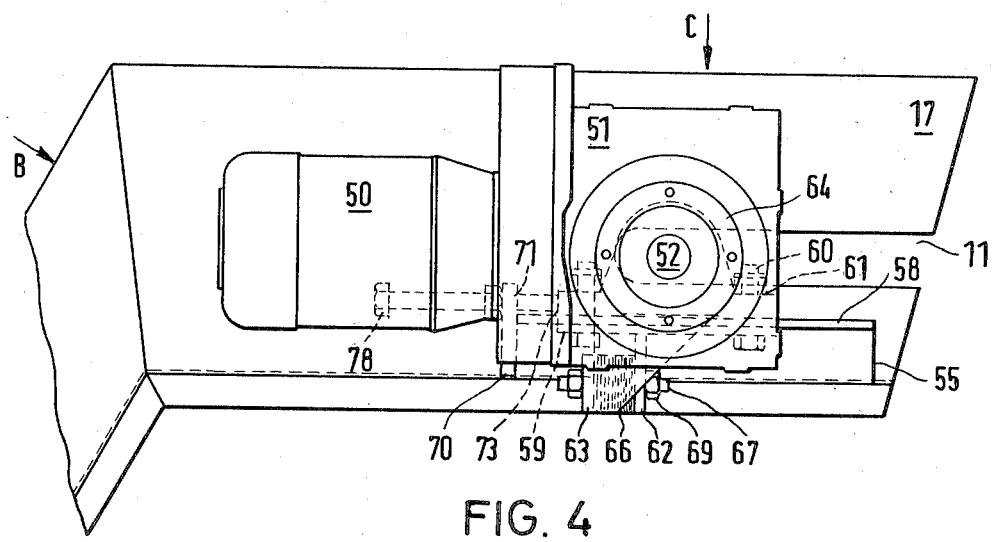
Figure 5:
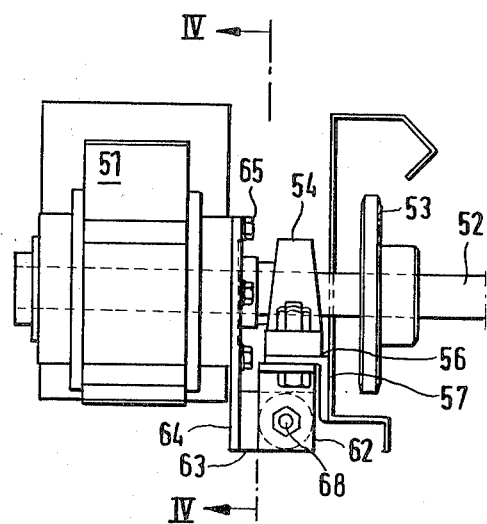
Figure 6:
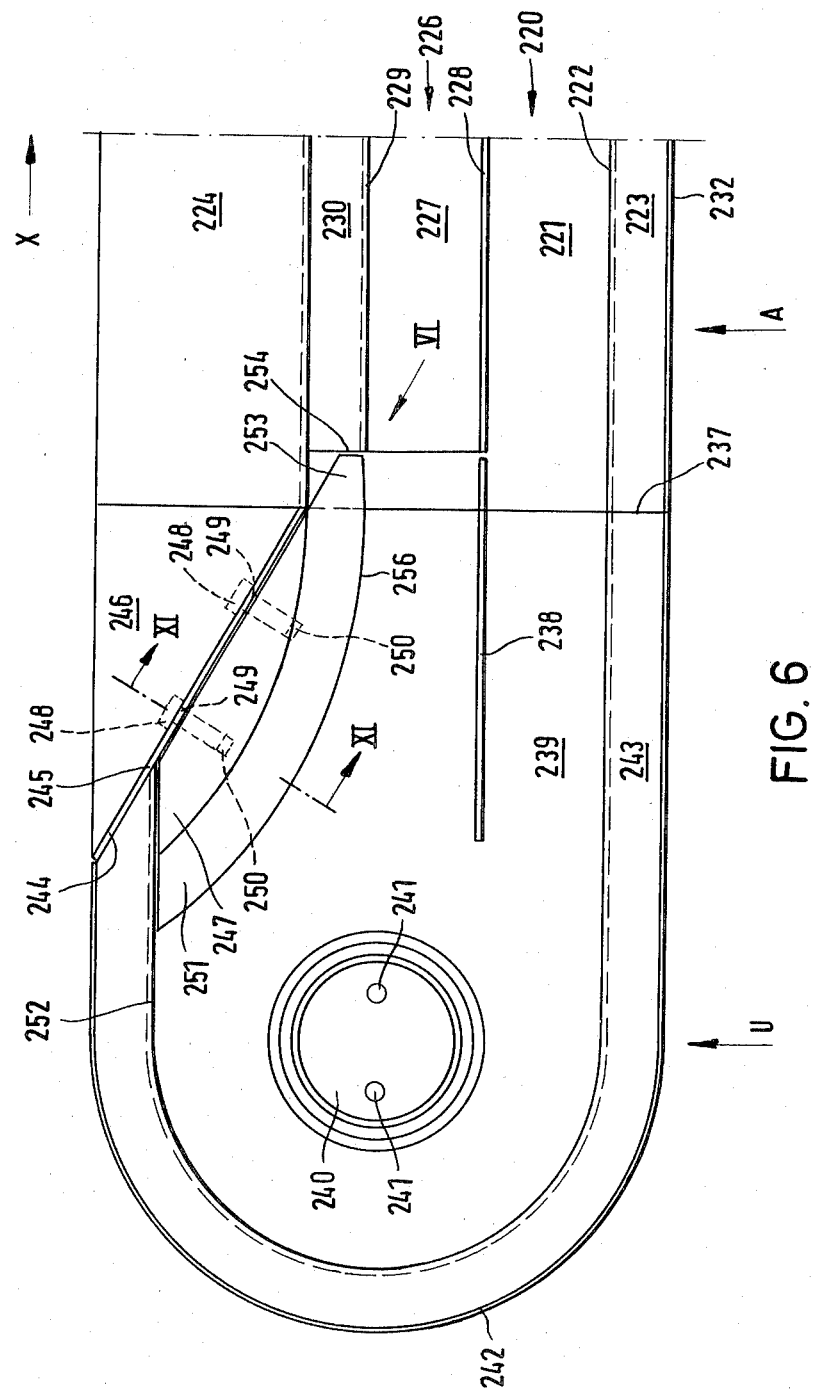
Figure 7:
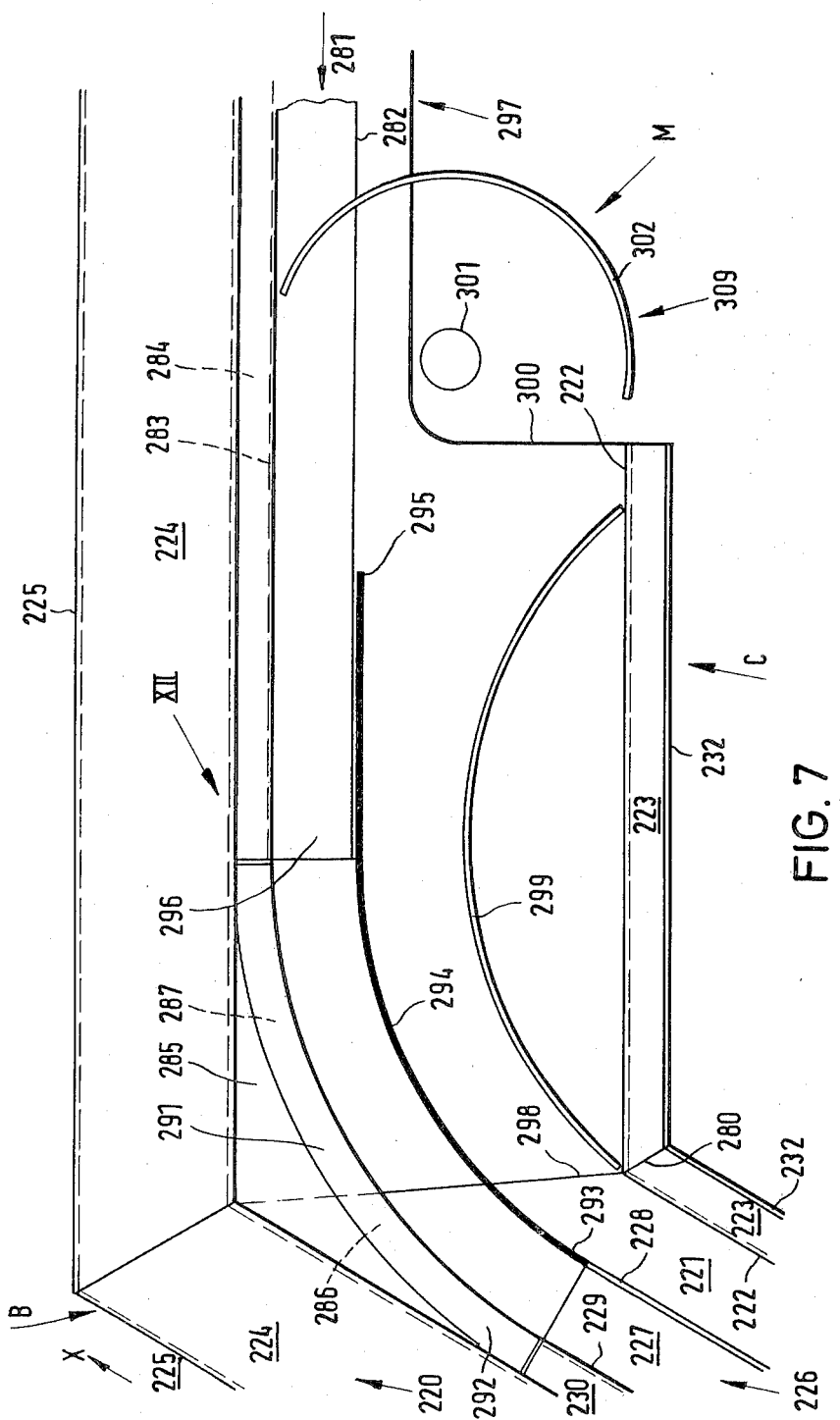
Figure 8:
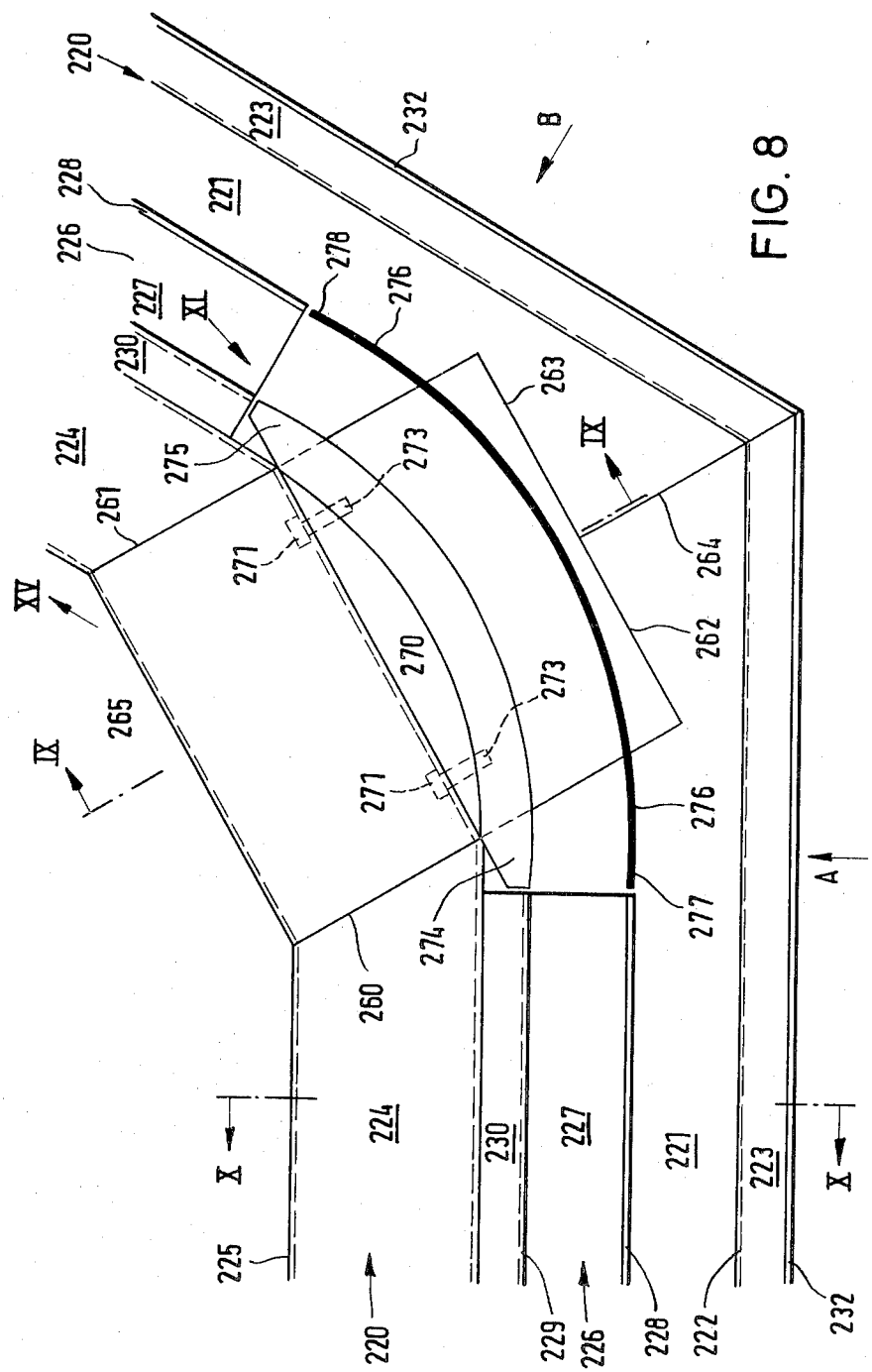
Figure 9:
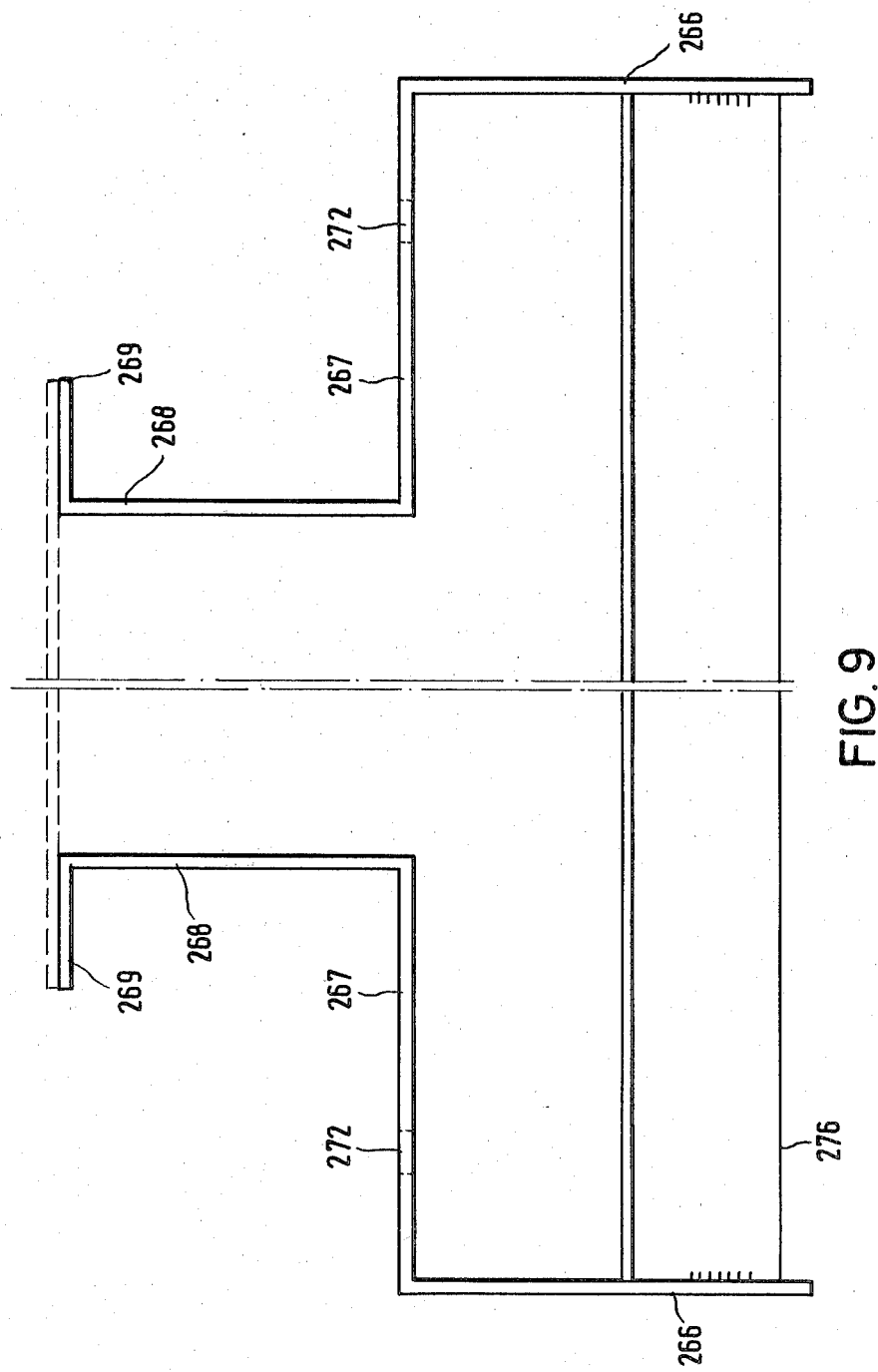
Figure 10:
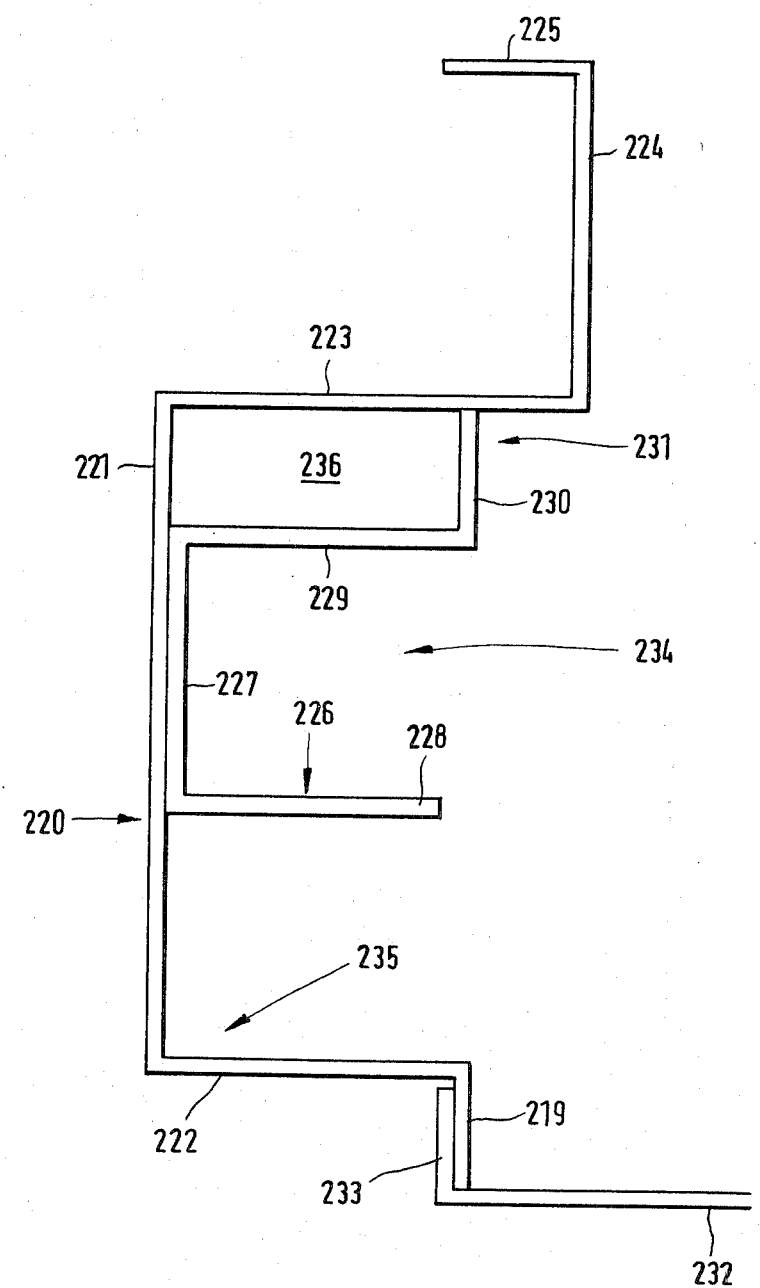
Figure 11:
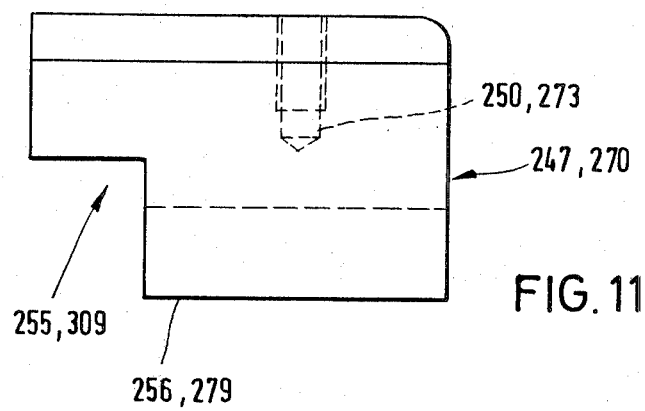
Figure 12:
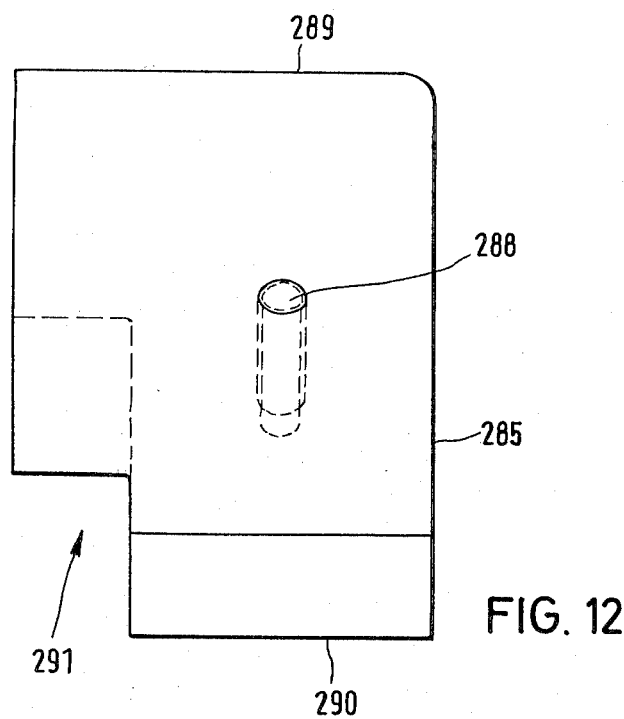
Figure 13:
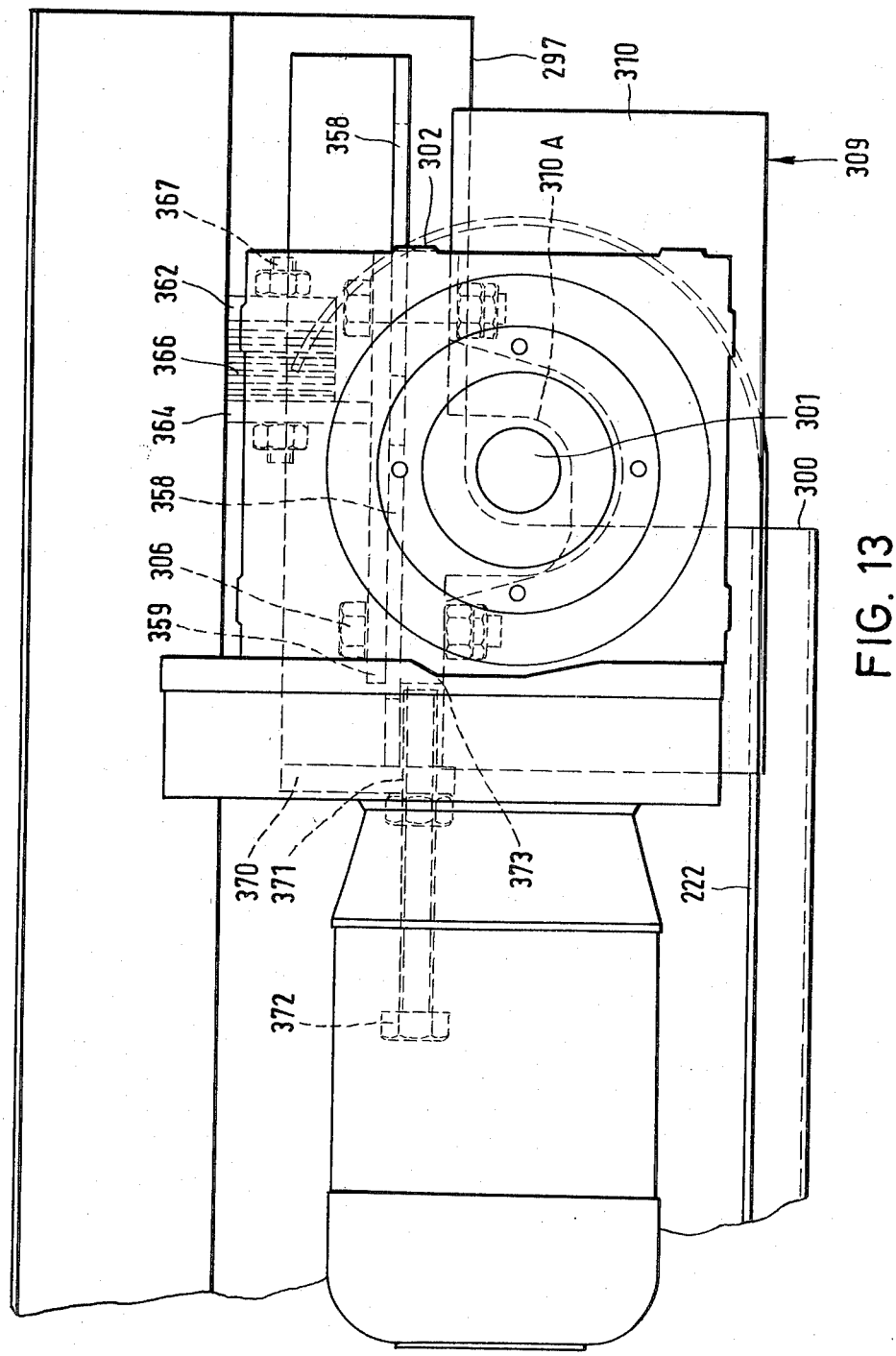
Figure 14:
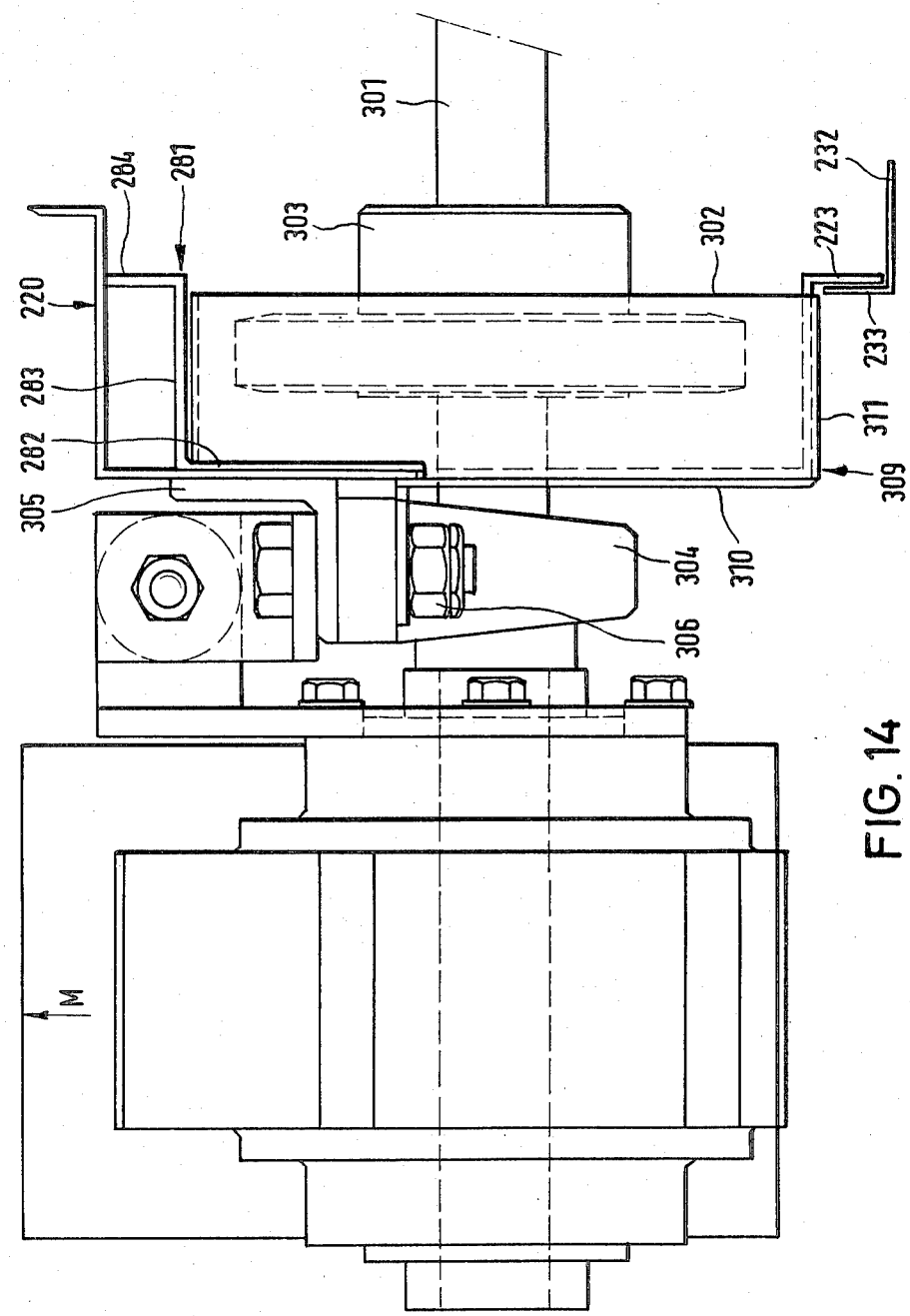
Figure 15:
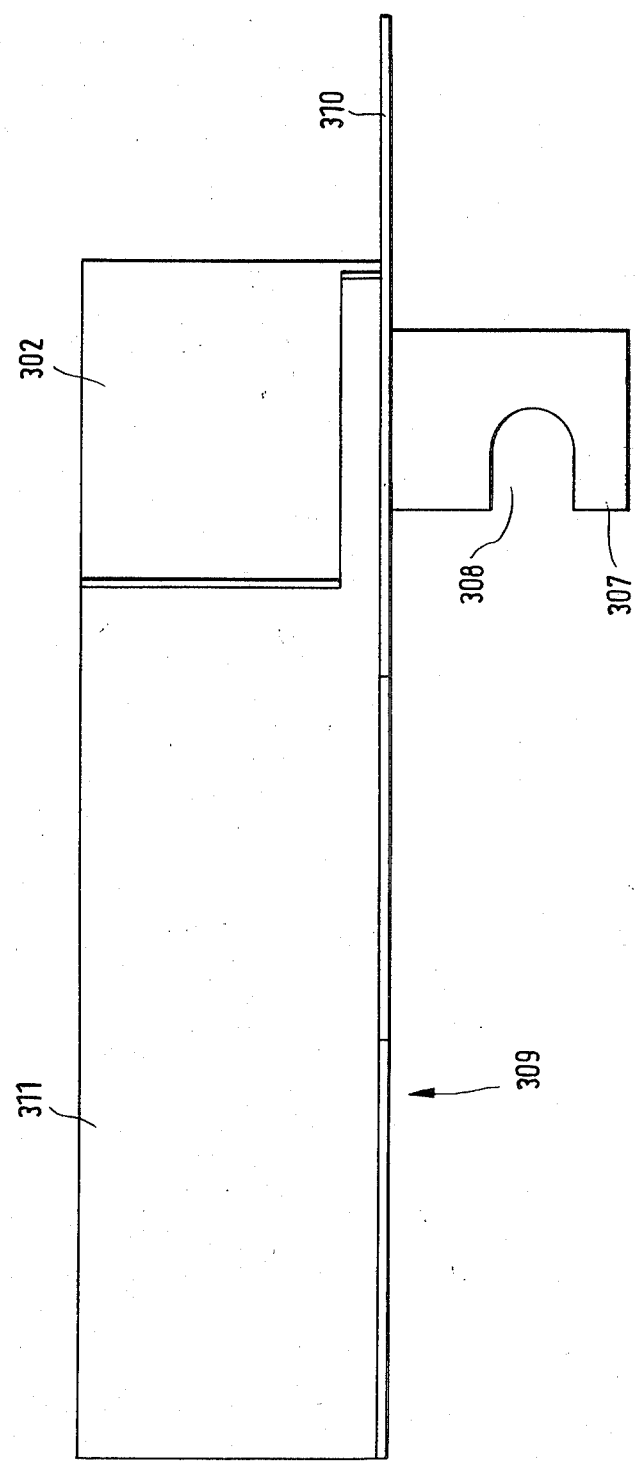
Figure 16:
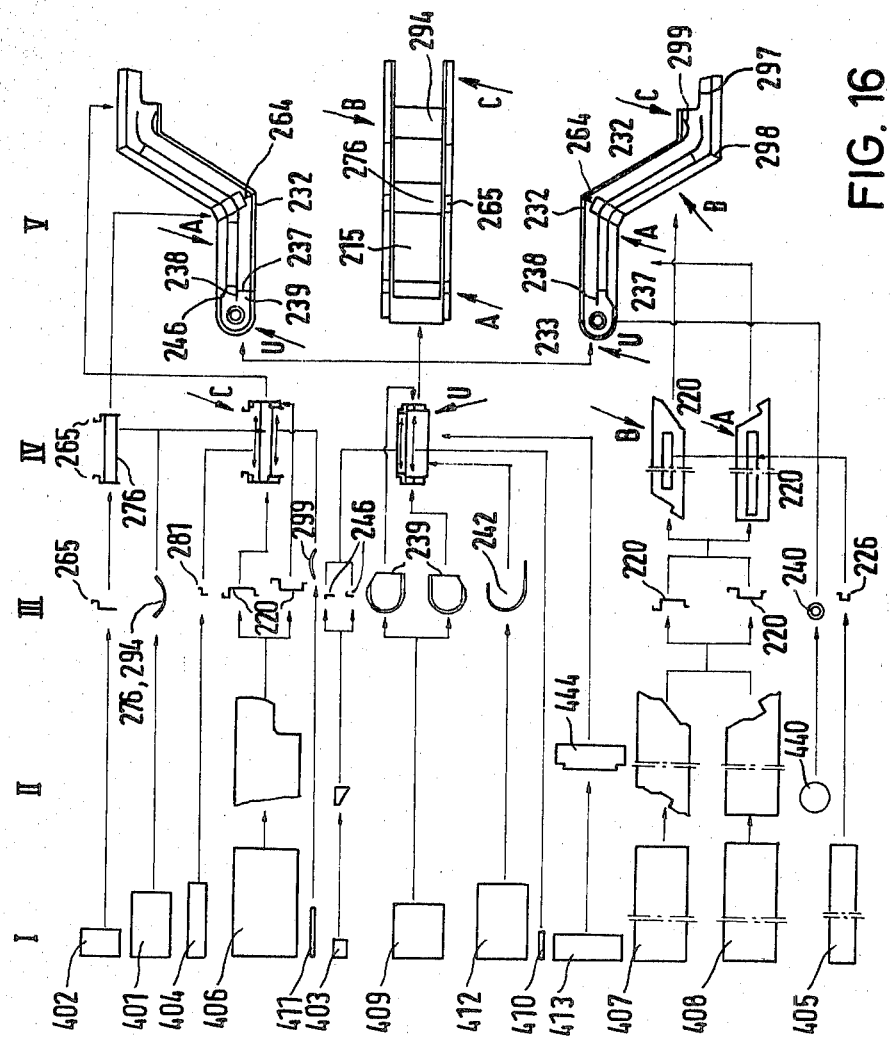

FIG. 1 shows a conveyor in longitudinal section along the sectional line I—I in FIG. 2, FIG. 2 shows a cross-section along the line II—II in FIG. 1, FIG. 3 shows a cross-section according to FIG. 2, with cover plate in place, in a cut away view, FIG. 4 shows a section view along the sectional line IV—IV in FIG. 5, FIG. 5 shows an end view of the drive unit in the direction of the arrow V in FIG. 4, FIG. 6 shows an inside view of the side piece, on the left in the conveying direction, of the reversing station, with fitted curved piece and reversing drum, and of a lower horizontal front section of a conveyor designed as a lifting conveyor, FIG. 7 shows a central longitudinal section through the upper end of the middle section, directed obliquely upwards, and of an upper horizontal end section of the conveyor, with the drive station without drive unit, with welded curved crosspiece and fitted solid curved piece, FIG. 8 shows a central longitudinal section through the conveyor, in the region of the bend between the lower horizontal conveyor section and the conveyor section directed obliquely upwards, with gusset plate, curved piece and curved crosspiece, FIG. 9 shows a cross-section along the sectional line IX—IX in FIG. 8 through the two gusset plates of the conveyor which lie opposite one another, FIG. 10 shows a cross-section along the sectional line X—X in FIG. 8, FIG. 11 shows an end view of the curved piece in the direction of the arrow XI in FIGS. 6 and 8, FIG. 12 shows an end view of the curved piece according to the arrow XII in FIG. 7, FIG. 13 shows a side view of the drive station with drive unit and chain guard, FIG. 14 shows an end view to FIG. 12, FIG. 15 shows a plan view of a chain guard at the drive station, and FIG. 16 shows a production diagram for the lifting conveyor.

A lifting conveyor is described below with reference to the figures, although the invention can, of course, also be applied to a conveyor whose conveyor frame extends in a straight line.

Illustrated in FIGS. 1 and 2 is a hinged belt conveyor 10 for metal chips or the like, which consists of a conveyor frame 11 U-shaped in cross-section. The one end of the conveyor has a drive station M which is displaceable in the longitudinal direction of the conveyor 10 in longitudinal slots 12 of the latter, for the tensioning of a hinged belt 13. The other end of the conveyor is provided with a reversing station U for the endless flexible hinged belt 13. Running rollers 14, 15 in the working side of the hinged belt are supported on running plates 19 which project horizontally inwards from the vertical side wall 16 of the side pieces 17, 18 of the conveyor frame 11. In the empty side, the running rollers 14, 15 are supported on a horizontal section 21 of a lower, substantially inwardly directed leg 22 of the side pieces, said horizontal section being provided underneath the running plates 19 and being elevated in respect of a baseplate 20 of the conveyor frame.

Lateral borders 24, in the upper side of the hinged belt, which are located on both sides of hinged belt plates 23 and which overlap one another mutually in the traverse direction of the hinged belt are covered by substantially horizontal upper legs 25 of the two substantially U-shaped side pieces 17, 18 which lie opposite one another with the open sides spaced apart. Holes (not shown) in the hinged belt plates guarantee the drainage of liquid adhering to the conveyed material, for example cooling and/or cutting oil.

The legs 20a, 20b of the U-shaped baseplate 20 are connected, by screwing or welding, to longitudinal edges 38 which are bent downwards in respect of the horizontal sections 21 of the lower legs 22 of the side pieces 17, 18. As a result, on the one hand, perfect sealing of the conveyor frame for the cutting oil or the like which is collected by metal chips or other objects, and, on the other hand, excellent stiffening of the conveyor frame can be achieved. In the case of a liquid coolant which can flow away at the end of the conveyor, there is no need to weld the baseplate to the side pieces. However, liquid-tight welding between the baseplate and side pieces is necessary for the case where the level of the liquid to be collected is chosen to be higher than the legs of the baseplate, in order to enable impurities to be deposited on the baseplate and to enable correspondingly purified liquid to flow away out of an opening (not shown) of the conveyor frame which lies above the baseplate.

The top side of the horizontal section 21 of the lower legs 22 of the side pieces 17, 18 constitutes the running face for the running rollers 14, 15 of the hinged belt 13 in the empty side.

The upper legs 25 of the side pieces 17, 18 are formed by a section 26, which extends substantially horizontally inwards from the side walls 16 of said side pieces and which, as shown in FIG. 2, extends approximately horizontally, at a spacing, beyond the top side of the lateral border 24 of the hinged belt 13 in the working side and, thereafter, is bent obliquely inwards and downwards towards the hinged belt 13 with a section 27 at an angle of approximately 45° to the horizontal. The free longitudinal edge 28 of the upper legs 25 is bent through 90° to the abovementioned bent section 27 and extends downwards and rearwards to the inside of the associated lateral border 24 of the hinged belt 13, in such a way that approximately the top third of the height of the lateral border 24 projects upwards above the margin 29 of the section 28. Because of this shaping of the profile of the side pieces, the conveyed material is constantly deflected to the center of the hinged belt and a further increase in the resistance to warping of the conveyor frame and, simultaneously, excellent sealing between the lateral borders 24 in the working side of the conveyor and the sections 28 of the side pieces 17, 18 are achieved, said sealing ensuring a high degree of safety against the penetration of metal chips or the like into the conveyor frame. The curvature of the upper leg 25 can also be rounded off, provided that it is ensured that said upper leg is directed inwards towards the inside of the associated lateral border and permits deflection of the conveyed material to the center of the conveyor belt.

In the region of a connecting line 30, the sections A and B of the conveyor frame butt against one another with the end edges of their side pieces and baseplates and are welded to one another at those points. In a similar way, the sections B and C of the conveyor frame are welded to one another at their end edges in the region of an offset sectional line 31. As a result, it is possible, in a very simple way, to connect sections of the conveyor frame, which have been appropriately cut to size, to one another at their end edges by welding.

The insides, lying opposite one another in the section, of the sections A, B and B, C of the conveyor frame 11, which are welded to one another, are connected, in these reversing regions of the hinged belt 13, by one curved reversing plate 33 and 34, respectively, for the rollers 14, 15 of the hinged belt 13 in the working side and in the empty side respectively. Two guide plates 32, assigned to the working side of the hinged belt, in the reversing region between the lower horizontal section A and the section B, directed obliquely upwards, of the conveyor 13, are fastened to the insides of the side pieces 17, 18 and constitute the continuation of the running plates 19; they have a curved length which extends, at both ends of the guide plates 32, beyond the points at which the longitudinal axis of the two mutually angled sections A, B of the conveyor frame forms a tangent to the curved guide plates 32.

On the other hand, the ends of the reversing plate 33 which is assigned to the empty side are guided, in the reversing region, between the two conveyor sections A, B, respectively, only up to the points at which the ends of the running plates 19 of the mutually angled sections A, B of the conveyor frame 11 form a tangent, respectively, to the arc of curvature of the reversing plate 33. In this way, perfect guidance of the rollers of the hinged belt is guaranteed, both in the working side and in the empty side, and, indeed, even when vibrations occur, particularly in the working side.

The reversing plate 34 which is assigned to the working side, in the reversing region between the section B which is directed obliquely upwards and the upper horizontal section C of the conveyor 10, extends in the longitudinal direction of said conveyor up to those two points at which the running plates 19 of the two mutually angled sections B, C of the conveyor frame form a tangent, respectively, to the arc of curvature of the reversing plate 34.

On the other hand, the front ends of the two guide plates 35 are associated with the return strand of the hinged belt and are mounted on the opposite inner sides of the side pieces 17, 18, which side pieces are connected to the horizontal leg sections 21 of the lower legs 22 of the side pieces 17, 18. The guide plates extend into the reversing region of the return strand of the drive station M at the end of the upper horizontal section C of the conveyor frame 11. By means of these guide plates in the region of the sections of the conveyor frame which are affixed to one another and in the region of the reversal of the hinged belt, excellent guidance of said belt through these reversing regions as well as stiffening of the conveyor frame are achieved.

The baseplate 20 of the upper horizontal section C of the conveyor 11 extends approximately horizontally underneath the guide plates 35 for the empty side of the hinged belt in the drive station M, at a spacing, and over a length which is designed so that the inside of the conveyor frame 13 is accessible through an intervention opening 47. Since the drive station M is simultaneously a discharge station, it is guaranteed, in this way, that, without the danger of injury, an operator can reach through the intervention opening 47 into the inside of the conveyor frame and can inspect the operating condition of said conveyor frame end, if necessary, clean it.

At the reversing station U, two curved reversing plates 36 extend, in the reversing region of the working side of the hinged belt 13, above the latter up to the running plates 19, each on a side piece 17, 18 of the conveyor 10. The rear ends, lying in the reversing station U, of the guide plates 36 are located above the point of tangential contact of the looping arc of the hinged belt 13 round a reversing member 37 which can be designed as a fixed inner return curve, as a rotatable reversing pulley or as a chain wheel.

On the other hand, the ends, which are at the front in the conveying direction, of the guide plates 36 are curved beyond the point tangential to the longitudinal direction of the conveyor 10. These guide plates guarantee safe guidance of the hinged belt at the reversing station U and increased rigidity of the side pieces.

The baseplate 20 is guided completely round the reversing station U from below and ends, in the conveying direction x, behind the cross-sectional plane in which the center point of the looping arc of the hinged belt is located. A chute plate 39 is affixed to this end of the baseplate and is welded to the side pieces 17, 18, so that it extends obliquely downwards towards the hinged belt 13 up to the lower free margin 29 of the section 28 which is bent towards the inside of the lateral border 24. The chute plate 39 imparts to the reversing station a high resistance to warping and permits a feed of the conveyed material very near the end of the reversing station, without the conveyed material being able to penetrate into the conveyor frame between the lateral borders of the hinged belt and the side pieces.

FIG. 3 shows a cover plate 40 which has a main side 41 which is parallel to the main plane of the conveyor frame 11 and which has two side legs 42, 43 which are directed substantially downwards thereto. The side legs consist of an upper vertical section 44 which adjoins the sections 45 and 46 which interact with the sections 27, 28 of the upper legs of the side pieces. It is evident that the sections 45, like the sections 27, are bent towards the conveyor center at an angle of approximately 45° to the horizontal. The section 46 of the side legs of the cover plate is made substantially narrower than the sections 28, but is also bent through 90° in respect of the section 45 outwards in the direction of the inner side of the lateral border or of the side wall of the associated side piece, so that the side legs of the cover plate engage with the sections 45, 46 in a sealing manner, with a locking fit, between the sections 27, 28, lying opposite one another, of the upper legs 25 of the side pieces 17, 18. As a result, an extraordinarily simple and rapid assembly of the cover plate on the conveyor is achieved, without special fastening elements being required between the cover plate and conveyor frame. The cover plate can be removed again just as quickly, if this is desired. Of course, the profile of the side legs 42, 43 can, likewise, be rounded off, if the side pieces are correspondingly curved, as already mentioned.

According to FIGS. 4 and 5, the drive station M consists of a drive motor 50 which can be driven electrically or hydraulically. Interlocked with this drive motor is a gear 51 whose output is coupled coaxially to a drive shaft 52 on which a drive member 53, for example a chain wheel for the hinged belt 13, is keyed, in all cases secure against rotation, in the region of the two side pieces 17, 18. The drive shaft 52 is mounted, on the two outer sides of the side pieces 17, 18 of the conveyor frame 11, in one bearing block in each case, of which only the one bearing block 54 can be seen in FIGS. 4 and 5. The bearing block is supported on a mounting rail 55 which runs parallel to the longitudinal direction of the conveyor frame 11 and which consists of the horizontal leg 56 of an angle section which is welded with the other leg 57 to the outer side of the side pieces 17. The mounting rail has two slotted holes 58 which extend in the longitudinal direction of the mounting rail at a spacing from one another. Provided underneath the mounting rail is a backing plate 59 which has threaded bores (not shown) through which bolts 60 extend transversely upwards and, in so doing, pass, in each case, through the slotted holes 58 and through bores (not shown) in the flanges 54a, 54b of the bearing blocks and are held under stress by means of nuts 61.

A bracing plate 62 extends downwards from the backing plate 59. A further bracing plate 63 lies opposite this bracing plate 62, looking in the longitudinal direction of the conveyor, at a spacing and at the same height, namely on the side facing away from the conveyor end which has the drive station M. As shown in FIG. 5, this bracing plate 63 is bent transversely in the direction of the conveyor at the lower end of a perforated disc 64 which is fastened, by means of screws 65, to the end side of the gear housing 51 in a plane parallel to the longitudinal direction of the conveyor. A spring element 66 which can be subjected to tension and compression can be held under stress axially between the two bracing plates 62, 63 by means of a tensioning device 67 which consists, in the present case, of a threaded bolt 68 which passes through two horizontal bores in the bracing plates 62, 63 as well as the spring element 66 and which is locked on the outside of the two bracing plates 62, 63 by means of nuts 69.

FIGS. 4 and 5 also show that the mounting rail 55 has, at its end facing away from the end of the conveyor, a clamping plate 70 which is directed transversely to the conveyor and which projects over the horizontal mounting rail 55 with a section 70a above and beyond the mounting rail 55. This upper projection 70a contains a threaded bore 71 which extends horizontally in the longitudinal direction of the conveyor and receives a tensioning screw 72 whose free end directed towards the end of the conveyor lies against a stop face 73, facing away from the adjacent end of the conveyor, of the associated bearing block 54, so that this bearing block is displaceable, together with the drive unit and the spring abutment 62, 63, 66, in the longitudinal direction of the conveyor, relative to the conveyor frame 11 and can be fixed axially in respect of the latter. It is thus evident that, when the drive unit is displaced to tension the hinged belt 13, the entire spring abutment which consists of the two bracing plates 62, 63 and of the spring element 66 is also displaced simultaneously, so that it is not necessary, after a displacement of the drive unit, to effect a separate adjustment of the spring abutment.

For the case where an additional stiffening of the conveyor frame is desired, transverse struts 48 can be provided, as indicated in FIG. 2, which extend between the running plates 19 on the inner sides, lying opposite one another, of the side pieces 17, 18. Preferably, these transverse struts are, in that case, located in the region of the welded joints of two, for example, horizontal conveyor sections. The transverse struts 48 can consist of the material of the running plates and can, if necessary, be constructed integrally with sections of these.

Referring to FIGS. 6, 7 and 8, the lifting conveyor is composed of a lower horizontal front conveyor section A (FIG. 6) which contains the charge and reversing station, a middle section B (FIGS. 7 and 8) which is directed obliquely upwards and an upper horizontal end section C which contains the discharge and drive station.

The conveyor frame is composed of two side pieces, one side piece 220 is illustrated in FIG. 6 and whose vertical main side 221 has a lower horizontal leg 222 and an upper horizontal leg 223, which are each bent through 90° in the direction of the center of the conveyor. The free end 219 of the lower horizontal leg 222 is bent downwards, whilst the upper horizontal leg 223 is made wider, in respect of the lower leg 222, by an amount which somewhat exceeds the width of the lateral border of a hinged belt (not shown) for the lifting conveyor. The upper leg 223 of the side piece constitutes a vertical shaft wall 224 to a height corresponding to the distance between the working side and its point of reversal. The upper free end 225 of this shaft wall is bent outwards at right angles and serves for the fastening of a cover plate, it this is desired (not shown). A substantially U-shaped formed metal sheet 226 is welded with its web 227 to the inner side of the main side 221 of the side piece. The lower leg 228 of this formed metal sheet projects perpendicularly inwards from the inner side of the main side 221 and serves as a running track for the working side of the hinged belt. The upper leg 229 of the formed metal sheet 226 extends parallel to the lower leg 228 likewise towards the center of the conveyor, its free end 230 being bent rectangularly upwards towards the underside of the upper leg 223 of the side piece 220, the optionally welded, at a point which is spaced from the end of the upper leg 223, thus enabling the side pieces of the hinged belt to move freely in the rectangular profile cut-out 231. The upwardly bent end 230 lies approximately in a common vertical plane with the downwardly bent end 219 of the lower leg 222 of the side piece. A baseplate 232 of the conveyor is made U-shaped in cross-section, of its two legs FIG. 10 showing the leg 233 which surrounds externally the downwardly bent end of the lower leg 222 of the side piece 220 and which is either spot-welded thereto or welded in a leak-tight manner over its entire length, namely depending on the leak-tightness requirements of the conveyor frame. It is thus evident that the formed metal sheet 226 constitutes a guide channel 234 for the working side of the hinged belt, whilst the lower leg 228 of the formed metal sheet 226, together with the lower leg 222 of the side piece 220 and a part of its main side 221, constitute a guide channel 235 lying thereunder for the empty side of the hinged belt, the lateral borders of which, as already mentioned, engage in the profile cut-out 231 underneath the upper leg 223 of the side piece 220 and are protected by said cut-out, whereas, on the other hand, the upwardly bent end 230 of the formed metal sheet 226 constitutes, if necessary, a lateral guide or stop face for the lateral borders of the hinged belt as well as a closure of the cavity 236 of the conveyor. It goes without saying that a corresponding side wall is located, as a mirror image and with a spacing, opposite the side piece 220 illustrated in FIG. 10 and is fastened, likewise, to the baseplate 232 on its other upwardly directed leg (not shown).

The side pieces extend, in the region of the lower horizontal front section A of the conveyor, up to a vertical joint 237 at which the reversing station U is welded to the front ends of the side pieces. It is evident that the formed metal sheet 226 terminates at a distance before the joint 237 and that, at the height of the lower horizontal leg 228 of the formed metal sheet 226, a straight guide plate 238 which corresponds approximately to the width of the leg is welded, respectively, to the inner side of the main side 221 of the side pieces 220 and to the inner side of the side piece 239 of the reversing station. The end, facing the reversing station, of the guide plate terminates at a distance before a reversing drum 240 for the hinged belt, said reversing drum appropriately being deep-drawn from a sheet and being provided on an axis of symmetry with two holes 241 which enable the reversing drum to be reversed by turning through 180° in a clockwise or anticlockwise direction, when one peripheral section of the reversing drum, which is stressed by the hinged belt, has become worn, and this can be effected in a simple way merely by loosening screws (not shown). As a result, with simple servicing, a doubled life of the reversing system is achieved.

It is evident, furthermore, that the reversing plate has on the outside a profile which corresponds to the side pieces, and a curved cover plate 242 wholly surrounds the reversing station simply as a continuation of the baseplate 232 and is connected firmly to the outwardly bent margin 243. In the region of the upper end 244 which lies higher in terms of the looping radius, the side piece 239 of the reversing station is beveled obliquely downwards in the direction of the joint 237 at the height of the upper shoulder 223 of the side piece 220 and is welded to a chute plate 245 which extends transversely over the conveyor and is likewise welded to the other side piece of the reversing station. Provided on the top side of the chute plate is a vertical angle piece 246 which runs in the plane of the shaft wall 224 of the side pieces of the conveyor frame and is aligned with the top edge of said shaft wall and is welded at the joint 237 to the shaft wall 224. The chute plate 245 extends, over a width corresponding to one of the upper shoulders 223 of the side piece 220, behind the angle piece 226, that is to say, behind the plane of the drawing in FIG. 6, and is connected releasably, at that point, on the underside to a solid curved piece 247 by means of cap screws 248 which extend through holes 249 of the chute plate in threaded bores 250 of the curved piece. The curved piece is cut off horizontally at its upper end 251 and lies against the underside of a leg 252, corresponding to the lower leg 222 of the side piece 220, of the side piece 239 of the reversing station. The other end 253 of the curved piece extends beyond the vertical joint 237 up to the end 254, which is at the front in the conveying direction of the arrow x, of the formed metal sheet 226 over a width and height corresponding approximately to the cavity 236 of the side piece 220, as may be seen from the end view in FIG. 11 according to the arrow VI in FIG. 6. The approximately rectangular recess 255 corresponds to the profile cut-out 231 of the side piece 220 for the lateral border of the hinged belt and extends, in accordance with the lower curved face 256 of the curved piece, in an arcuate manner from the end 251, at the front in the conveying direction x, of the curved piece. The curved piece is fastened in the same way, as a mirror-image, to the other side piece of the reversing station and imparts to the reversing station an additional resistance to warping and a long life as a result of a considerable resistance to wear. At the same time, a rapid change-over or replacement is possible due to the screwing of these curved pieces to the chute plate, analogously to the case of the reversing drums 240 which are fitted to the two sides of the side pieces of the reversing station.

Whilst the bridging of the joint 237 by the guide plate 238 and the associated welding of the latter to the inner side both of the side piece 220 of the conveyor section A of the conveyor and of the side piece 239 of the reversing station U impart a higher rigidity to the conveyor section, it is evident that a tangent to the point of intersection of the curved face 256 of the curved piece with the joint 237 runs horizontally and that the curved face is guided upwards in the direction of the rear end 253, that is to say, out of the path of movement of the working side of the hinged belt. In this way, a perfect transition is guaranteed, during the movement of the working side, from the curved piece to the formed metal sheet 226 which constitutes the guide channel 234.

According to FIG. 8, the side pieces of the conveyor section A and of the conveyor middle section B which is directed obliquely upwards are each provided with a rectangular cut-out 260, 262; 261, 263, the oppositely directed cut edges 262 and 263 being aligned with one another and extending at right angles to a joint 264 between the side pieces 220 of the adjacent conveyor sections A and B. The cut-out which is constituted by the cut edges 260, 261, 262 and 263 is located symmetrically to the joint 264 and receives a gusset plate 265 which preferably has a larger wall thickness than the side pieces 220 and which is welded to said cut edges. In the view according to FIG. 8, the gusset plate 265 is accordingly made rectangular, but, as illustrated in FIG. 9, has a transverse profile whose lower leg 266 directed downwards is aligned approximately with the main side 221 of the side walls 220 of the two conveyor sections A and B, whilst a transverse shoulder 267 of the gusset plates which lie opposite one another in pairs is welded to the shoulders 223 of the side pieces. The adjoining shaft walls 268 of the gusset plates are aligned with the shaft walls 224 of the side pieces 220 and are welded to these. Upper outwardly bent ends 269 of the shaft walls of the gusset plates are welded, with their end sides, to the bent ends 225 of the shaft walls 224. Consequently, the profile of the gusset plates corresponds to that of the side pieces 220, looking upwards from their main side 221, but omitting the formed metal sheet 226 which is replaced at this reversing point likewise by a curved piece 270 which is screwed to the underside of the transverse shoulder 267 by means of screws 271, which pass through the holes 272 (FIG. 9)

and engage in threaded bores 273 in the curved piece. The end 274, which is at the front in the conveying direction of the arrow x, and the rear end 275 of the curved piece are guided beyond the point at which a tangent to the arc of curvature runs in the longitudinal direction of the conveyor sections A and B respectively, so that, even here, perfect transitions are guaranteed, during the movement of the working side, out of the conveyor channel of the conveyor section A into the conveyor channel of the middle section B of the conveyor. Here, also, the curved piece is either cast or molded, so that it is highly resistant to wear, but, on the other hand, can be replaced easily. The possibility also exists, here, of exchanging the curved pieces which are on the left and on the right respectively in the conveying direction, since the screwing is provided symmetrically to the joint 264, in the event that, for example, wear occurs essentially only on the section of the curved pieces which lies before the joint 264 in the conveying direction. FIG. 11 likewise illustrates an end view of the curved piece 270 in the direction of the arrow XI in FIG. 8, with the curved face 279 and recess 309 for the lateral borders in the working side of the conveyor belt.

The gusset plates 265 which are welded into the adjacent ends of the side pieces, lying opposite one another, of the conveyor sections A and B are, like the outer ends, welded to the gusset plate, of the side pieces, welded to the longitudinal edges of an curved crosspiece 276 whose front edge 277 and rear edge 278 terminate, with the end faces of the ends 274 and 275, respectively, of the curved piece, in a common transverse plane of the conveyor sections A and B respectively and, like the curved piece, are curved with their ends beyond the point at which a tangent to the arc of curvature of the curved crosspiece runs precisely in the longitudinal direction of the associated conveyor section A or B. Since the curved crosspiece 276 limits upwardly the conveyor channel 235 for the empty side of the hinged belt, in the region of the bend between the two conveyor sections, a shock-free transition of the empty side as it moves round the curved crosspiece is also guaranteed in this way. As a result of the welding of the curved crosspiece to the adjacent conveyor sections and to the gusset plate on each side of the conveyor frame and as a result of the profiling, adapted to the side pieces, of the gusset plate and of the solid curved piece screwed to the latter, a particularly high resistance to bending and to warping is imparted to the conveyor frame in the region of the bend between its two conveyor sections A and B.

According to FIG. 7, the oppositely directed ends of the side pieces of the two conveyor sections B and C are welded directly to one another at a joint 280. The end, at the rear in the conveying direction x, of the formed metal sheet 226 terminates in the conveyor section B at a considerable distance before the joint 280, whilst a Z-shaped formed metal sheet 281 is welded, at a considerable distance behind the joint 280, to the inner wall of the main side of the side piece 220 of the upper horizontal end section C of the conveyor, at a lower leg 282 whose height corresponds approximately to the height of the web 227 of the U-shaped formed metal sheet 226 in the conveyor sections A and B and whose transverse shoulder 283 is made approximately as wide as the upper horizontal leg 229 of the formed metal sheet 226, the upwardly bent leg 284 of the formed metal sheet 281 corresponding approximately to the upwardly bent end 230 of the U-shaped formed metal sheet 226 and being located approximately in the plane of the latter. Inserted, in turn, on the underside of the upper shoulders 223 of the side pieces 220 of the two conveyor sections B and C, in the region of their bend or joint 280, is a cast or molded curved piece 285 which is connected releasably to the adjacent side pieces by means of cap screws (not shown) which are provided in the region of the axes 286 and 287 respectively, as illustrated, and which were described in conjunction with the abovementioned curved pieces. Since this curved piece is exposed to less wear, it can also be made of plastic.

In the end view of the curved piece 285 according to FIG. 12, the threaded hole 288 which is assigned to the side piece of the conveyor section C can be recognised, and, as in the case of the curved pieces described further above, the top side 289 corresponds approximately to the width of the underside of the upper shoulder 223 of the side pieces, whilst the lower curved face 290 which limits the guide channel 234 for the working side on the top side has a width which corresponds, in turn, approximately to the width of the upper leg 229 of the U-shaped formed metal sheet 226 in the conveyor section B, or of the transverse shoulder 283 of the Z-shaped formed metal sheet 281 in the conveyor section C. The rectangular cut-out 291 serves, in turn, to receive or guide the lateral borders of the hinged belt. The upper wider part with the bearing faces 289 completely fills the corner space underneath the upper legs 283 of the oppositely bent side pieces of the conveyor sections B, C, so that this space cannot become clogged with conveyed material.

In the transverse plane of the end face of the end 292, at the front in the conveying direction x, of the curved piece 285, there lies the front end-edge 293 of a further curved crosspiece 294 which is welded, with its two side edges parallel to one another and extending in the longitudinal direction of the conveyor, to the adjacent ends of the side pieces of these conveyor sections, with bridging of the joint 280. The curvature of the curved crosspiece runs, again, parallel to the lower guide face 290 of the curved piece 285. The end 295, at the rear in the conveying direction x, of the curved crosspiece is, however, guided obliquely downwards, far beyond the end 296, at the front in the conveying direction x, of the Z-shaped formed metal sheet 281, into the vicinity of the corner of an approximately rectangular cut-out 297 in the side piece and out of the path of movement of the working side. Consequently, the working side of the hinged belt is guided as far as is necessary, whilst, on the other hand, the upper horizontal end section of the lifting conveyor acquires an extraordinarily high resistance to bending and to warping.

In the region of the joint 280, in the direction of alignment of the lower leg 222 of the side piece of the middle section B of the conveyor, the end 298, at the front in the conveying direction x, of a guide plate 299 is welded to the lower leg 222 of the side piece of the upper end section C, said guide plate 299 being guided, in an arcuate manner approximately parallel to the curved crosspiece 294, to a point at which a tangent to the guide plate is directed in the longitudinal direction of the upper horizontal end section C of the conveyor. From this point which lies somewhat behind the front end 296 of the Z-shaped formed metal sheet 281, the guide plate 299 is guided back in an arcuate manner downwards to the lower leg 222 of the side piece of the conveyor section C in the vicinity of a downwardly directed cut edge 300 of the cut-out 297. As a result of this design of the curved crosspiece 294 and of the guide plate 299, which limit the guide channel 235 for the empty side on the top side and underside, the entry opening of said guide channel in the region of the drive station M is substantially wider than its normal height, represented by the transverse profile of the side piece in FIG. 10, so that a perfect entry of the empty side into the guide channel 235 is guaranteed. As a result, it is simultaneously possible to remove easily, from the surface of the guide plates 299 which slopes towards the rearward opening of the conveyor, or from the bottom 232 of the conveyor, remains of conveyed material which do not detach from the empty side until the region of entry of the empty side into the guide channel 235. At the same time, these guide plates 299 also serve as stiffening ribs for the side pieces of the end section C of the conveyor.

Furthermore, FIG. 7 indicates a drive shaft 301 and its position relative to the cut-out 297, as well as, also, a chain guard 309 which is, likewise, to be discussed in more detail below in conjunction with FIGS. 13 to 15.

According to FIG. 14, in the region of the two side pieces of the drive or discharge station, the drive shaft 301 carries one chain sprocket-wheel in each case, one chain sprocket-wheel being designated by 303 in FIG. 14. The shaft ends which project beyond the two outer sides of the side pieces are each mounted in a bearing block 304 which is fastened to the underside of a horizontal flange of an angle-shaped mounting rail 305 by means of a screw connection 306, the other flange of the mounting rail being fastened to the outer side of the main side 221 of each side piece 220. The screw connection which faces the end of the conveyor in FIG. 14 serves to fasten an attachment plate 307 (FIG. 15) of the chain guard 309, said attachment plate being provided, on the side facing away from the conveyor, with a long notch 308 for engaging the bolt of the screw connection 306 and being welded to the upper edge of the outer side of a screening plate 310 which extends, at right angles to the attachment plate, parallel to the main side of the side piece 220 and which covers with its outer margin the cut-out 297 in the side piece. The upper margin of the screening plate is provided with a notch 310a which encloses the drive shaft 301 from below and from the sides with a clearance. The guard plate 302 is welded, with one side edge, to the inner side of the screening plate at a radial distance from the periphery of the chain drive-wheel 303 and extends, with its upper end, beyond the upper edge of the screening plate 310 up to the underside of the transverse shoulder 283 of the Z-shaped formed metal sheet on the inner side of the side pieces of the end section C of the conveyor. FIGS. 13 to 15 indicate that the upper end, which projects over the upper edge of the screening plate 310, of the arcuate guard plate 302 is made narrower than the lower part which is welded to the screening plate 310. As a result, it is possible to guide the upper end, which extends over the upper edge of the screening plate, of the curved guard plate past the vertical leg 282 up against the underside of the upper horizontal shoulder 283 of the Z-shaped formed metal sheet 281 and, in this way, to obtain a complete protection of the chain drive against contact. Since the guard plate 302 constitutes a horizontal leg 311, at the lower end of the screening plate 310, towards the inside of the conveyor, the underside of the conveyor is covered from below, in the region of the chain drive, even at the recess 297 of the side pieces, and the operating personnel is consequently protected from injury due to contact with the chain drive.

Because the screening plate is connected to the bearing block for the drive shaft which is, in turn, coupled conventionally to a drive unit M, the screening plate is automatically also adjusted in the longitudinal direction of the conveyor when the hinged belt or conveyor belt is tensioned, so that there is no need for a releasing or a special change-over of the chain screening in the case of a longitudinal adjustment of the drive shaft 301 for the purpose of tensioning the hinged belt.

The production of the lifting conveyor according to the invention is described below with reference to FIG. 16. In an initial step I, in the left part of FIG. 16, thirteen starting sheets 401 to 413 are cut to a certain width required for the lifting conveyor to be produced, and to the necessary length, from coils of broad strip (not shown) and are prepared for the process step II in which the starting sheets 403, 406, 407, 408 and 413 are cut off to predetermined lengths or are contoured at the ends to the necessary extent.

In the subsequent production step III, all the above-mentioned sheets, with the exception of the sheet 413 which is ready for assembly already in the working step II, are bent or deep-drawn. Thus, the curved crosspieces 276 and 294 (FIGS. 2 and 3) are produced from the starting sheets 401, the starting sheets 402 which constitute the gusset plates 265 are profiled, as mirror images to one another, to correspond to the side pieces, likewise the angle pieces 246 for the reversing station, and the starting sheets 404 are bent into the Z-shaped formed metal sheets 281, and the sheet 405 into the U-shaped formed metal sheets 226. The starting sheets 406, 407 and 408 are bent, respectively, to the profile of each of the two side pieces of the conveyor. On the other hand, the starting sheets 409 are brought by deep-drawing to the form of the side pieces at the reversing station. Furthermore, a sheet 440, in the form of a circular disc, which is introduced in the working step II is deep-drawn, in duplicate, to the reversing drum 240 and is provided with the two holes for the securing screws. The starting sheets 411 are bent to correspond to the guide plates 299 in FIG. 2, whilst the starting sheet 412 constitutes the cover plate 242 in the region of the reversing station.

In the production step IV, the curved crosspiece 276 is welded to the two gusset plates 265. The side pieces 220, together with the cut-out 297, which are assigned to the drive or discharge station are welded, on the inner side, to the Z-shaped formed metal sheets 281 and the guide plates 299 as well as the curved crosspiece 294 and, on the outer side, to the mounting rail 305, to constitute a complete drive station C. Moreover, the U-shaped formed metal sheets 226 are welded to the inner sides of the side pieces 220 for the lower horizontal conveyor section A and for the conveyor middle section B which is directed obliquely upwards.

The angle pieces 246, the guide plates 238, the chute plate 45 and the cover plate 242 are welded together, in step IV, to constitute the complete reversing station U.

In a subsequent production step V, the parts mentioned in conjunction with the production step IV are welded to one another at the joints 237, 264 and 298 and at the cut edges 261, 262, 263, 264 and, subsequently, the baseplate sections 232 are fastened in accordance with the required leak-tightness.

In a production step VI, the reversing drums 40 and the curved pieces 247, 270, 285 are fitted into the conveyor framework. The lifting conveyor is then completed installing the drive unit M, drawing-in the hinged belt and fastening the chain guard on both sides.

The process described above indicates that parts which are standardized for different sizes of conveyors can be produced extremely economically from the coil simply by cutting to size, deep-drawing, bending and welding, this method of manufacture allowing a rapid change-over to automatic production of conveyors.

Whilst a lifting conveyor and the process for its production have been described in the foregoing, it is evident that it is readily possible to manufacture a straight-line conveyor, if the front section A and the end section C of the conveyor described are imagined as being aligned with one another in the longitudinal direction and connected to one another, in which case only the side pieces of the end section C, in FIG. 8, need to be adapted to correspond to the side pieces of the front section A, so that a plane top side of the conveyor frame can be obtained for a straight-line conveyor of this type. Moreover, in such a case, appropriate guide devices would be provided in the region of the drive station, instead of the curved crosspiece 294 and the bent guide plates 299.

Finally, it is clear to a person skilled in the art that the conveyor can also be equipped, for example, with a scraper chain or with other conveyor belts, instead of the hinged belt (not shown). In this case, it is merely necessary to provide, at the height of the guide plates 238 or of the lower legs 228 which project inwards from the side pieces, plates which preferably integrally connect the side pieces lying opposite one another, that is to say, which are completely continuous both in the transverse direction and in the longitudinal direction of the conveyor, and which, in the case of the lifting conveyor, are welded at the ends to the curved crosspieces, so that a continuous leak-tight conveyor trough is provided for the scraper chain.

What is claimed:

1. Conveyor, particularly a hinged belt conveyor, preferably for metal waste such as chips or the like, with a conveyor frame, U-shaped in cross section, having side pieces having upper and lower inwardly bent legs, said side pieces being connected by cross pieces one end of which is provided with a drive station which is adjustable in the longitudinal direction of the conveyor and is supported by means of an abutment, and the other end of which is provided with a reversing station for said endless flexible hinged belt which includes running rollers said other end including guide channel means supporting said rollers constituted by U-shaped formed metal sheet means having upper and lower inwardly bent legs, and a webb, fastened to the inside of said side pieces connected by said cross pieces a chute plate and arcuate guide means located in the reversing regions for the conveyor belt, characterized in that the arcuate guide means comprising releasably fastened solid curved pieces, one pair of which is fastened, at the reversing station, to the underside of said chute plate which extends downwards, between the side pieces from the top side of the reversing station towards the hinged belt, the lower legs of said side pieces which guide the return side of the hinged belt are connected by means of a U-shaped base plate means which is at least partially disposed around the reversing station with the exception of the top side of the latter.

2. Conveyor according to claim 1, which is designed as a lifting conveyor, in which a middle longitudinal section which is directed obliquely upwards extends between a lower and an upper horizontal longitudinal section, characterized in that the arcuate guide means for the side of the hinged belt which lies, in each case, on the outside in the reversing regions of the mutually angled longitudinal sections of the conveyor frame comprised curved crosspieces which extend continuously between the inner sides of the side pieces of the adjacent longitudinal sections and which are connected firmly thereto.

3. Conveyor according to claim 2, characterized in that the lower and middle longitudinal sections of the conveyor frame are connected partly by a pair of welded-in gusset plates, the inner sides, lying opposite one another, of the gusset plates and of adjacent side pieces being welded to the curved crosspiece.

4. Conveyor according to claim 3, characterized in that each gusset plate is adapted to the profile of the associated side pieces, and in that a solid curved piece whose guide face has a curvature parallel to the curved crosspiece is fastened releasably, in each case, to the underside of a transverse shoulder of the gusset plates which corresponds to the upper leg of the side pieces.

5. Conveyor according to claim 2, characterized in that the side pieces of the middle and upper longitudinal sections of the conveyor are welded directly to one another, and in that the top side of the guide channels for the working side of the hinged belt is constituted by two further solid curved pieces which bridge the joint between the middle and upper longitudinal sections, said further curved pieces being adapted to the profile of the formed metal sheet means on the inner side of the side pieces and being connected releasably thereto.

6. Conveyor according to claim 1, characterized in that the arcuate guide means at the drive station comprises guide plates which are assigned to the return side of the hinged belt and which are connected, at their end which is at the front in the conveying direction, to the horizontal, inwardly bent legs of the side pieces and which extend, with their end which is at the rear in the conveying direction, out of the path of movement of the empty side of the hinged belt.

7. Conveyor according to claim 1, characterized in that at the drive station another baseplate extends approximately horizontally underneath bent guide plates of the side pieces for the empty side of the hinged belt at such a spacing and over such a length that the inside of the conveyor frame is accessible through an intervention opening.

8. Conveyor according to claim 1, characterized in that the end of the upper legs of the U-shaped formed metal sheet means is bent upwards at right angles towards the underside of the upper inwardly bent leg of the side pieces and is welded to said leg at a distance from the free end of the upper legs of the side pieces.

9. Conveyor according to claim 1, characterized in that there are assigned to the working side, in the end section of the conveyor, Z-shaped formed metal sheet means which correspond to the profile of the U-shaped formed metal sheet means, with their lower inwardly projecting leg being omitted.

10. Conveyor according to claim 1, characterized in that the reversing device for the hinged belt at the reversing station consists of two reversing drums which are mounted releasably on the side pieces.

11. Conveyor according to claims 1, 2, 3, 4, 5, 6, 7, 8, 9, or 10 whose drive station consists of a drive motor, a gear unit and a drive shaft with reversing members for the conveyor belt, the drive shaft being mounted, on the two outer sides of the side pieces of the conveyor frame, in each case in a bearing block which is connected to a mounting rail running parallel to the longitudinal direction of the conveyor frame, characterized in that the bearing blocks are each connected to a backing plate, arranged in the mounting rail, by means of bolts which pass, in each case, through a slotted hole which extends, in the mounting rail parallel to the longitudinal direction of the conveyor and in that two bracing plates extend from the backing plate parallel to one another at a spacing, transversely to the longitudinal direction, between which bracing plates a spring element can be held under stress axially by means of a tensioning device.

12. Conveyor according to claim 1, characterized in that a chain guard at the drive station consists of two screening plates which cover the cut-outs, surrounding the drive shaft of the side pieces and which is each connected releasably to one of the bearing blocks fastened to the side pieces.

13. Conveyor according to claim 11, characterized in that the screening plates are each fastened, by means of a lateral attachment plate, with a screw of the bearing block, to the latter, and in that the upper margin is provided with a notch which surrounds the drive shaft from below and from the sides with a spacing there between.

14. Conveyor according to claim 13, characterized in that a guard plate which is curved concavely in respect of a chain sprocket wheel of the drive shaft is welded, with a part of its die margin, to the inner side of the screening plate, the lower end of the guard plate terminating at the height of the lower horizontal leg of the side pieces and the upper end terminating at the height of the transverse shoulder of the Z-shaped formed metal sheet means on the inner side of the side pieces.

* * * * *